(12) United States Patent
Kitamura (10) Patent No.: US 8,668,377 B2
(45) Date of Patent: Mar. 11, 2014

(54) GAS DILUTER

(75) Inventor: Nobuyuki Kitamura, Yamanashi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1397 days.

(21) Appl. No.: 11/989,508

(22) PCT Filed: Jul. 26, 2006

(86) PCT No.: PCT/JP2006/315241
§ 371 (c)(1),
(2), (4) Date: Jan. 25, 2008

(87) PCT Pub. No.: WO2007/013656
PCT Pub. Date: Feb. 1, 2007

(65) Prior Publication Data
US 2009/0282981 A1    Nov. 19, 2009

(30) Foreign Application Priority Data
Jul. 26, 2005   (JP) .................... 2005-215926

(51) Int. Cl.
*B01F 13/02*   (2006.01)
*B01F 15/02*   (2006.01)
*B01F 3/02*    (2006.01)

(52) U.S. Cl.
USPC ........................ 366/181.5; 366/336

(58) Field of Classification Search
USPC .......... 48/180.1; 137/599.01, 599.03, 599.12, 137/896; 366/181.5, 336
See application file for complete search history.

(56) References Cited

U.S. PATENT DOCUMENTS

| 136,066 A | * | 2/1873 | Johnson | 261/92 |
| 190,902 A | * | 5/1877 | Remsen | 137/13 |
| 350,849 A | * | 10/1886 | Snee | 48/180.1 |
| 1,190,681 A | * | 7/1916 | Spitzer | 137/595 |
| 1,742,096 A | * | 12/1929 | Perrier | 494/65 |
| 2,158,716 A | * | 5/1939 | Bergdoll | 62/120 |
| 2,249,077 A | * | 7/1941 | Doucette | 137/203 |
| 2,608,477 A | * | 8/1952 | Shaeffer | 48/180.1 |

(Continued)

FOREIGN PATENT DOCUMENTS

| DE | 2446089 | * | 4/1986 | B01F 5/18 |
| DE | 3605507 A1 | * | 8/1987 | B01J 19/00 |

(Continued)

OTHER PUBLICATIONS

DE 3605507 machine translation (EPO).*

(Continued)

*Primary Examiner* — Tony G Soohoo
(74) *Attorney, Agent, or Firm* — Kenyon & Kenyon LLP (57) ABSTRACT

A gas diluter which comprises: dilution chambers in which a first gas is mixed with a second gas to reduce the concentration of the first gas; connecting passages with which the dilution chambers are connected serially; branched passages through which the first gas is distributed to the dilution chambers, an introduction passage through which the second gas is introduced into the dilution chamber, which is located at one end of the serially connected dilution chambers; and a discharge opening through which the gas obtained by mixing the first gas with the second gas is discharged from the dilution chamber, which is located at the other end of the serially connected dilution chambers.

6 Claims, 3 Drawing Sheets

(56) References Cited

U.S. PATENT DOCUMENTS

| | | | | |
|---|---|---|---|---|
| 2,714,292 | A * | 8/1955 | Strandwitz et al. | 222/6 |
| 2,808,180 | A * | 10/1957 | Calamai | 222/146.4 |
| 2,865,724 | A * | 12/1958 | Arnold | 48/127.1 |
| 2,899,374 | A * | 8/1959 | Gomory | 208/47 |
| 3,385,199 | A * | 5/1968 | Smith, Jr. | 99/483 |
| 3,417,779 | A * | 12/1968 | Golay | 137/896 |
| 3,858,793 | A * | 1/1975 | Dudrey | 494/60 |
| 4,030,897 | A * | 6/1977 | Pelzer et al. | 95/249 |
| 4,283,497 | A * | 8/1981 | Hirshaut | 435/286.7 |
| 4,705,669 | A * | 11/1987 | Tsuji et al. | 422/93 |
| 4,834,782 | A * | 5/1989 | Silva | 95/197 |
| 5,344,382 | A * | 9/1994 | Pelzer | 494/60 |
| 5,435,913 | A * | 7/1995 | Ashbrook | 366/162.4 |
| 5,765,585 | A * | 6/1998 | Peterson | 137/9 |
| 5,793,831 | A * | 8/1998 | Tsiklauri et al. | 366/167.1 |
| 6,004,515 | A * | 12/1999 | Parce et al. | 422/504 |
| 6,062,261 | A * | 5/2000 | Jacobson et al. | 137/827 |
| 6,109,286 | A * | 8/2000 | Johnston | 137/15.05 |
| 6,213,151 | B1 * | 4/2001 | Jacobson et al. | 137/827 |
| 6,500,323 | B1 * | 12/2002 | Chow et al. | 204/450 |
| 6,523,572 | B1 * | 2/2003 | Levin et al. | 138/37 |
| 6,599,736 | B2 * | 7/2003 | McCaskill et al. | 435/288.5 |
| 6,629,775 | B2 * | 10/2003 | Choikhet et al. | 366/336 |
| 6,705,357 | B2 * | 3/2004 | Jeon et al. | 141/9 |
| 6,793,964 | B2 * | 9/2004 | Hoad | 427/212 |
| 6,883,559 | B2 * | 4/2005 | Jeon et al. | 141/9 |
| 7,077,799 | B2 * | 7/2006 | Gorham et al. | 494/37 |
| 7,143,785 | B2 * | 12/2006 | Maerkl et al. | 137/597 |
| 7,476,363 | B2 * | 1/2009 | Unger et al. | 422/102 |
| 7,481,982 | B2 * | 1/2009 | Ichikawa | 422/177 |
| 7,824,815 | B2 * | 11/2010 | Yamazaki et al. | 429/446 |
| 7,919,323 | B2 * | 4/2011 | Cristobal et al. | 436/34 |
| 7,922,981 | B2 * | 4/2011 | Hauptmann | 366/336 |
| 2002/0084185 | A1 * | 7/2002 | Sundberg et al. | 204/453 |
| 2002/0113095 | A1 * | 8/2002 | Jeon et al. | 222/424.5 |
| 2002/0187560 | A1 * | 12/2002 | Pezzuto et al. | 436/180 |
| 2003/0077488 | A1 | 4/2003 | Yamamoto et al. | |
| 2003/0198576 | A1 * | 10/2003 | Coyne et al. | 422/100 |
| 2004/0226884 | A1 * | 11/2004 | O'Connor et al. | 210/634 |
| 2005/0118471 | A1 | 6/2005 | Fukuma et al. | |
| 2006/0153754 | A1 * | 7/2006 | Hauptmann | 422/195 |
| 2006/0176764 | A1 * | 8/2006 | Walter et al. | 366/181.5 |
| 2006/0263658 | A1 | 11/2006 | Yanagi et al. | |
| 2007/0053237 | A1 | 3/2007 | Yoshida et al. | |
| 2009/0029200 | A1 * | 1/2009 | Izutani et al. | 429/13 |
| 2009/0188567 | A1 * | 7/2009 | McHugh | 137/15.05 |

FOREIGN PATENT DOCUMENTS

| | | | | |
|---|---|---|---|---|
| DE | 3606747 A1 | * | 9/1987 | B01F 5/06 |
| DE | 11 2004 002 128 T5 | | 11/2007 | |
| JP | 54-054372 A | | 4/1979 | |
| JP | 62038229 A | * | 2/1987 | B01F 5/06 |
| JP | 62289292 A | * | 12/1987 | C02F 1/66 |
| JP | 08-215553 A | | 8/1996 | |
| JP | 10-076011 A | | 3/1998 | |
| JP | 11-114393 A | | 4/1999 | |
| JP | 2003-132915 A | | 5/2003 | |
| JP | 2004-006183 A | | 1/2004 | |
| JP | 2004-127621 A | | 4/2004 | |
| JP | 2005-011640 A | | 1/2005 | |
| JP | 2005-011641 A | | 1/2005 | |
| JP | 2005-108805 A | | 4/2005 | |
| JP | 2005-116255 A | | 4/2005 | |
| JP | 2005-158523 A | | 6/2005 | |
| JP | 2005-158576 A | | 6/2005 | |
| JP | 2007-018816 A | | 1/2007 | |

OTHER PUBLICATIONS

IPCOM000133310D; Jan. 23, 2006; *Apparatus for Diluting Low-Level Reactive Gas Mixture.*

Office Action of JP 2005-215926 Issued Mar. 1, 2011 and English translation thereof.

\* cited by examiner

GAS DILUTER

This is a 371 national phase application of PCT/JP2006/315241 filed 26 Jul. 2006, claiming priority to Japanese Patent Application No. 2005-215926 filed 26 Jul. 2005, the contents of which are incorporated herein by reference.

FIELD OF THE INVENTION

The present invention relates to a gas diluter.

BACKGROUND OF THE INVENTION

A gas diluter is an apparatus for thinning a concentration of a gas. There are a variety of objects requiring the gas diluter, however, for example, a fuel cell can be given as an application object thereof.

In the fuel cell, hydrogen introduced on an upstream side of a fuel electrode passes through a passage provided on the surface of the fuel electrode and diffuses downstream. In the fuel electrode, the hydrogen is separated into protons and electrons, wherein the protons diffuse toward an air electrode within the electrode and a polymer membrane, while the electrons reach the air electrode from an external circuit. Then, oxygen, the protons and the electrons are coupled due to reaction within the air electrode, thereby producing water. With continuation of this reaction, an electric current flows to the external circuit, and the electric power is supplied to a load.

In this case, the hydrogen supplied to the fuel electrode is not completely consumed, while part of the hydrogen passes through the passage on the surface of the fuel electrode and is, it follows, discharged from a discharge passage provided downstream of the fuel electrode. A known system is a fuel cell system, in which the downstream side of the fuel electrode is closed for restraining the discharge of the hydrogen. Further, another known fuel cell is a circulation type fuel cell, which circulates the hydrogen discharged from the downstream side of the fuel electrode toward again the upstream side.

In any type of fuel cell, due to a vapor produced as a contaminant of the reaction within the fuel cell, transmission of nitrogen toward the fuel electrode from the air electrode, etc., within the fuel electrode and the passage on the side of the fuel electrode, the fuel gas has a stepwise increase in a rate of impurity other than the hydrogen. If the impurity in the fuel gas increases, a density of the hydrogen brought into contact with the surface of the fuel electrode decreases, and hence a quantity of generation of the protons is reduced, resulting in a disabled state of sufficiently generating the electric power. Therefore, in the fuel cell system, generally, a discharge valve is provided downstream of the fuel electrode and is opened and closed at an interval of a predetermined time while detecting states of a power generation quantity, an output voltage, etc of the fuel cell, then the hydrogen gas is fed to the side of the fuel electrode, and the fuel gas containing the impurity is discharged (which will hereinafter be called "purging"). In this case, the hydrogen is required to be diluted so that the density of the hydrogen contained in the fuel gas to be discharged is equal to or less than flammability concentration.

Such being the case, for example, Japanese Patent Laid-Open Publication No. 2005-11640 discloses a technology of mixing the hydrogen gas of which to purge the fuel cell with a cathode off-gas, thus diluting the hydrogen. Further, another known technology is that in a dilution apparatus for diluting the hydrogen of which to purge the fuel cell, dilution air corresponding to a discharge hydrogen quantity is fed in so that a concentration of the hydrogen after being diluted does not reach the flammability concentration (refer to, e.g., Japanese Patent Laid-Open Publication No. 2004-127621).

SUMMARY OF THE INVENTION

There is, however, intermittently carried out an operation of purging the fuel cell of the impurity, i.e., to discharge the off-gas on the side of the fuel electrode. Therefore, the concentration of the hydrogen contained in the off-gas, which is diluted by the diluter, fluctuates largely with a fluctuation of the concentration of the hydrogen flowing into the diluter. Hence, in a design based on an assumption of a maximum discharge quantity, a volume capacity of the diluter becomes extremely large as compared with a normally-required volume capacity.

On the other hand, a system for feeding in the dilution air corresponding to the discharge hydrogen quantity entails an extra quantity of electric power for feeding in the air, e.g., the electric power consumed in an air-compressor, resulting in a decrease in power generation efficiency.

The present invention was devised to solve the problems inherent in this type of conventional diluter. It is an object of the present invention to provide a technology of diluting a gas simply and efficiently.

The present invention adopts the following means in order to solve the problems given above. Namely, the present invention is a gas diluter for mixing a first gas with a second gas, comprising: a plurality of passages receiving introduction of the first gas and different from each other in terms of passing time of the first gas after being introduced; and mixing portion mixing the first gas passing through the plurality of passages with the second gas.

The "passing time" connotes a period of time of the gas passing through the passage extending from, e.g., each gas inlet of the passage to a mixing chamber. This type of passage can be said to be a plurality of passages different from each other in terms of the timings when the gas passing through each passage reaches the mixing chamber from the gas inlet.

In the diluter, the first gas passing through the plurality of passages different from each other in terms of the passing time is mixed with the second gas. Namely, the first gas is separated into the respective passages, and it follows that the separated flows of the first gas are mixed with the second gas at the different timings. Accordingly, it is feasible to dilute the gas simply and effectively.

Herein, the plurality of passages may include a plurality of dilution chambers decreasing a concentration of the first gas by mixing the first gas with the second gas; connection passages connecting the dilution chambers in series; and a branch passage introducing the first gas in distribution into the plurality of dilution chambers, and the mixing portion may include an introduction passage introducing the second gas into the dilution chamber positioned at one end portion of the plurality of dilution chambers connected in series; and a discharge port through which to discharge a mixture gas of the first gas and the second gas from the dilution chamber positioned at the other end portion of the plurality of dilution chambers connected in series.

The diluter has the plurality of dilution chambers connected in series, in which the first gas is introduced in distribution into the respective dilution chambers and then mixed with the second gas. Subsequently, in the plurality of dilution chambers connected in series, the mixed gas is discharged from the dilution chamber positioned at the other end portion, and hence it follows that the first gas is distributed into the plurality of dilution chambers and discharged via the connection passages at the different timings.

Further, the plurality of passages may include: a first passage having a first path length and diffusing the first gas; and a second passage branching off from the first passage and having a second path length, and the mixing portion may include: an introduction passage receiving the introduction of the second gas; a converging portion having convergence of the first gas passing through the first passage or the second passage with the second gas introduced from the introduction passage; and a discharge port discharging the mixture gas of the first gas and the second gas from the converging portion. With this configuration also, the first gas is distributed into the two passages having the different path lengths and is, it follows, discharged at the different timings.

Still further, the plurality of passages may include: a first passage having a first path length and diffusing the first gas; and a plurality of second passages branching off from the first passage and having second path lengths different from each other, and the mixing portion may include an introduction passage introducing the second gas; a converging portion having convergence of the first gas passing through any one of the first passage and the plurality of second passages with the second gas introduced from the introduction passage; and a discharge port discharging a mixture gas of the first gas and the second gas from the converging portion. With this configuration also, the first gas is distributed into the plurality of passages having the different path lengths and is, it follows, discharged at the different timings.

Yet further, the plurality of passages may include: a first passage having a plurality of inlets, provided at a start point of a path and midways of the path, into which the first gas is introduced; and a branch passage introducing the first gas in distribution into each of the inlets of the first passage, and the mixing portion may include: an introduction passage introducing the second gas; a converging portion having convergence of the first gas passing through the first passage with the second gas introduced from the introduction passage; and a discharge port discharging a mixture gas of the first gas and the second gas from the converging portion. With this configuration also, the first gas is distributed into the plurality of passages having the different path lengths and is, it follows, discharged at the different timings.

Moreover, the first gas may be a discharge gas discharged from a fuel cell and may be applied to the fuel cell that is purged of hydrogen intermittently.

The present invention enables the gas to be diluted simply and efficiently.

DETAILED DESCRIPTION

A best mode (which will hereinafter be termed an embodiment) for carrying out the present invention will hereinafter be described with reference to the drawings. Configurations in the following embodiments are exemplifications, and the present invention is not limited to the configurations in the embodiments.

First Embodiment

A diluter according to a first embodiment of the present invention will be described with reference to FIG. 1. In the first embodiment, the diluter is applied to dilution of an off-gas discharged from a fuel electrode side of a fuel cell.

Figure 1:
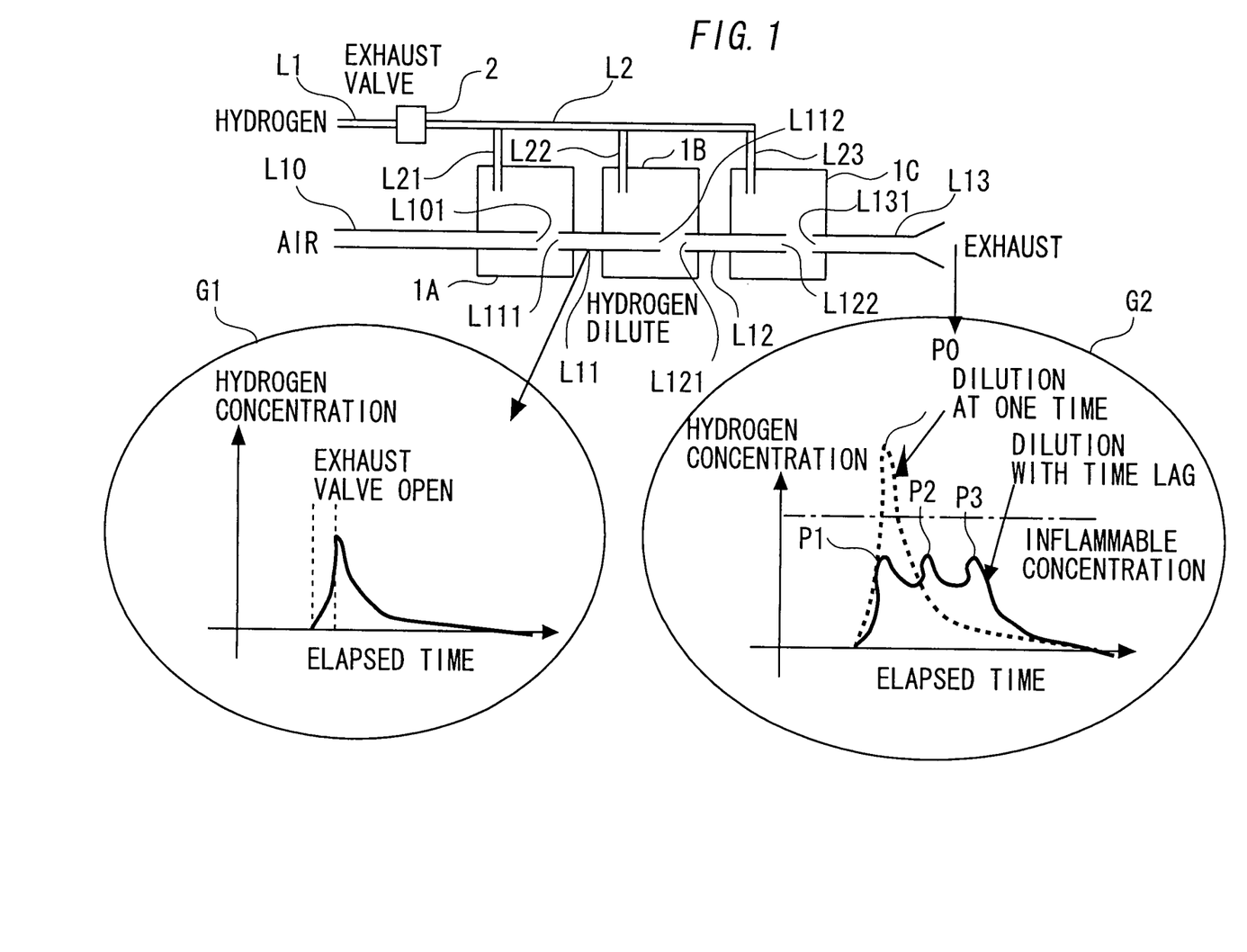
FIG. 1 is a view of a construction of a diluter according to a first embodiment of the present invention.

FIG. 1 is a diagram of a configuration of the diluter according to the first embodiment. As illustrated in FIG. 1, the diluter has a structure (corresponding to a plurality of passages according to the present invention) of connecting three dilution chambers 1A, 1B and 1C to each other via passages L11 and L12 (corresponding to connection passages according to the present invention). In the following discussion, the dilution chambers 1A, 1B and 1C will be generically referred to as simply the dilution chambers 1.

In the first embodiment, materials of the dilution chambers 1 and the passages L11 and L12 are not limited to those specified. Desirable materials are, however, e.g., hard-to-rust metals (stainless steep, aluminum, etc), ceramics, porcelain materials and so on. Further, the passages L11 and L12 may also be composed of high polymer materials such resins.

Moreover, FIG. 1 illustrates the dilution chamber constructed of a housing having a rectangular shape in section, such as a cube and a rectangular parallelepiped. The implementation of the present invention does not, however, particularly limit the shape of the dilution chamber. For example, there may not be caused any inconvenience by having a curved portion on an external surface or an internal surface of the dilution chamber.

The dilution chambers 1A, 1B and 1C are connected to each other via the passages L11 and L12. The passage L11 is built up by, e.g., piping. An end portion, on the side of the dilution chamber 1A, of the passage L11 is inserted shallow into the dilution chamber 1A. On the other hand, an end portion, on the side of the dilution chamber 1B, of the passage L11 is inserted deeper (than by the end portion on the side of the dilution chamber 1A) into the dilution chamber 1B. An end portion, on the side of the dilution chamber 1B, of the passage L12 is inserted shallow into the dilution chamber 1B. On the other hand, an end portion, on the side of the dilution chamber 1C, of the passage L12 is inserted deeper (than by the end portion on the side of the dilution chamber 1B) into the dilution chamber 1C.

Further, among the dilution chambers 1A, 1B and 1C connected in series, a passage L10 for introducing the air (which corresponds to an introduction passage according to the present invention) is connected from the left side in FIG. 1 to the dilution chamber 1A disposed upstream. The right-sided end portion of the passage L10 is inserted deep into the dilution chamber 1A, and an aperture L101 thereof is spaced in a face-to-face relationship at a predetermined distance from an aperture L111 formed in the left-sided end portion of the passage L11.

Similarly, within the dilution chamber 1B, an aperture L112 formed in the right-sided end portion of the passage L11 is spaced in the face-to-face relationship at the predetermined distance from an aperture L121 formed in the left-sided end portion of the passage L12. Moreover, a passage L13 for exhaustion (which corresponds to a discharge port according to the present invention) is connected to a right-sided wall portion of the dilution chamber 1C disposed downstream most. The left-sided end portion of the passage L13 is inserted shallow into the dilution chamber 1C. Then, within the dilution chamber 1C, an aperture L122 formed in the right-sided end portion of the passage L12 is spaced in the face-to-face relationship at the predetermined distance from an aperture L131 on the left side of the passage L13 for the exhaustion.

The passages L10 and L13 correspond to mixing portion according to the present invention.

Further, branch passages L21, L22 and L23 branching off from the passage L2 are connected respectively to the dilution chambers 1A, 1B and 1C. The passage L2 and the branch passages L21, L22 and L23 are in combination referred to as the branch passage L2 (corresponding to a branch passage according to the present invention). The passage L1 is connected via an exhaust valve 2 on the upstream side of the branch passage L2.

The passage L1 is connected to a discharge portion on the side of a fuel electrode of an unillustrated fuel cell. Materials of the passages L1, L10 and L13 and the branch passage L2 are the same as that of the passage L11.

The exhaust valve 2 (corresponding to a control valve according to the present invention) is a so-called cutoff valve having a valve opening state and a valve closing state. The exhaust valve is opened and closed at predetermined time intervals by an unillustrated ECU (Electronic Control Unit). Further, the ECU monitors states of the fuel cell, i.e., an output voltage of the fuel cell, a concentration of hydrogen on the side of the fuel electrode, etc and may, when a detected value thereof reaches a value of a predetermined range (when the output voltage or the concentration of the hydrogen decreases conspicuously), open and close the exhaust valve 2.

With this construction described above, the off-gas on the side of the fuel electrode, which is discharged from the exhaust valve 2, flows via the passage L2 and the branch passages L21, L22, L23, and diffuses within the dilution chambers 1A, 1B, 1C, respectively.

On the other hand, the air introduced from the passage L10 flows through a spaced area between the passage L10 and the passage L11, and flows into the passage L11. Similarly, the air flowing into the passage L11 passes through a spaced area between the passage L11 and the passage L12, and flows into the passage L12. Moreover, the air flowing into the passage L12 passes, within the dilution chamber 1C, through a spaced area between the passage L12 and passage L13, and flows into the passage L13. As a result, in a normal state, the air occupies a large proportion of gasses within the passages L10, L11, L12 and L13.

Accordingly, the hydrogen discharged from the exhaust valve 2 stays within the passage L2, the branch passages L21, L22, L23 and the dilution chambers 1A, 1B, 1C, and part of the hydrogen is mixed with a flow of the air in the spaced area between the passages L10 and L11, the spaced area between the passages L11 and L12 and the spaced area between the passages L12 and L13, and then diffuses within the passages L11, L12, L13 from the apertures L111, L121, L131.

Then, at a timing when the exhaust valve 2 opens, the off-gas containing the hydrogen having a comparatively high concentration is discharged into the passage L2, and hence the staying off-gas is extruded from the branch passages L21, L22, L23 into the dilution chambers 1A, 1B, 1C. This results in an increase in a ratio of the hydrogen passing through the apertures L111, L121, L131 from within the dilution chambers 1A, 1B, 1C and getting mixed with the gas in the passages L11, L12.

A graph G1 shows an example of a change in the concentration of the hydrogen in the passage L11. As the exhaust valve 2 opens and closes, the concentration of the hydrogen within the passage L11 rapidly rises and thereafter decreases stepwise.

The same phenomenon as that shown in the graph G1 occurs also in the passages L12 and L13. In this case, the concentration of the hydrogen contained in the gas discharged from the passage L13 is illustrated in a graph G2. The solid line in the graph G2 represents the concentration of the hydrogen in the gas discharged from the passage L13 by the diluter according to the first embodiment.

As described above, with the off-gas flowing in as the exhaust valve 2 opens, the off-gases within the dilution chambers 1A, 1B, 1C flow into the passages L11, L12, L13 substantially at the same timing. Accordingly, it follows that the off-gas flowing into the passage L13 from the dilution chamber 1C is exhausted earliest (which corresponds to a peak P1 in the graph G2). Subsequently, the off-gas flowing into the passage L12 from the dilution chamber 1B is exhausted via the passage L13 (which corresponds to a peak P2 in the graph G2). Finally, the off-gas flowing into the passage L11 from the dilution chamber 1A is exhausted via the passage L12 and the passage L13 (which corresponds to a peak P3 in the graph G2).

Hence, it follows that with respect to the concentration of the hydrogen of the off-gas diluted by the diluter, the highest concentration point of the hydrogen is, as depicted by the solid line of the graph G2, dispersed as at the three peaks P1, P2, P3.

The conventional diluter constructed of the single dilution chamber has, as indicated by a dotted line of the graph G2, a single peak P0 of the concentration of the hydrogen. In this case, if the dilution chamber is designed to have a small volume capacity, when in the maximum discharge, such a possibility might occur that the concentration of the hydrogen at the peak P0 exceeds a flammability concentration. Therefore, the conventional design entails setting the dilution chamber sufficiently large by making a prediction for the case of the maximum discharge.

The diluter is provided with a plurality of passages different from each other in terms of a period of time for which the gas reaches from the gas inlet (e.g., a position of the exhaust valve 2), a position, i.e., the dilution chamber (e.g., the third dilution chamber 1C in the case of FIG. 1), where the hydrogen is mixed with the air. In the case of FIG. 1, a first passage is a passage extending from the exhaust valve 2 via the passages L2, L23 to the dilution chamber 1C. Further, a second passage is a passage extending from the exhaust valve 2 via the passages L2, L22 and the dilution chamber 1B to the dilution chamber 1C. Still further, a third passage is a passage extending from the exhaust valve 2 via the passages L2, L21 and the dilution chambers 1A, 1B to the dilution chamber 1C. These passages can be said to be a plurality of passages different from each other in terms of the timing at which the gas passing through each of the passages reaches the mixing chamber from the gas inlet. The construction described above, which disperses the peak of the concentration of the hydrogen, therefore enables the diluter to dilute the hydrogen down to concentration of the hydrogen concentration less than the flammability concentration with a smaller volume capacity than by the prior arts.

Note that the three dilution chambers 1A, 1B, 1C are provided in the first embodiment. In the implementation of the present invention, however, the number of the dilution chambers is not limited to "3". For example, the two dilution chambers may be provided, and four or more dilution chambers may also be provided.

Second Embodiment

The diluter according to a second embodiment of the present invention will be described with reference to the drawings. The first embodiment has exemplified the diluter that disperses the peak of the concentration of the hydrogen of the gas to be discharged in a way that connects the plurality of dilution chambers 1A etc in series via the passages L11 etc.

In the second embodiment, a plurality of passages having different path lengths is provided within one dilution chamber. Then, there will be exemplified the diluter by which the off-gas gets diverged and passes through these passages, thus dispersing the peak of the concentration of the hydrogen. Other configurations and operations are the same as those in the first embodiment. Such being the case, the same components as those in the first embodiment are marked with the same symbols and numerals, and their explanations are omitted.

Figure 2:
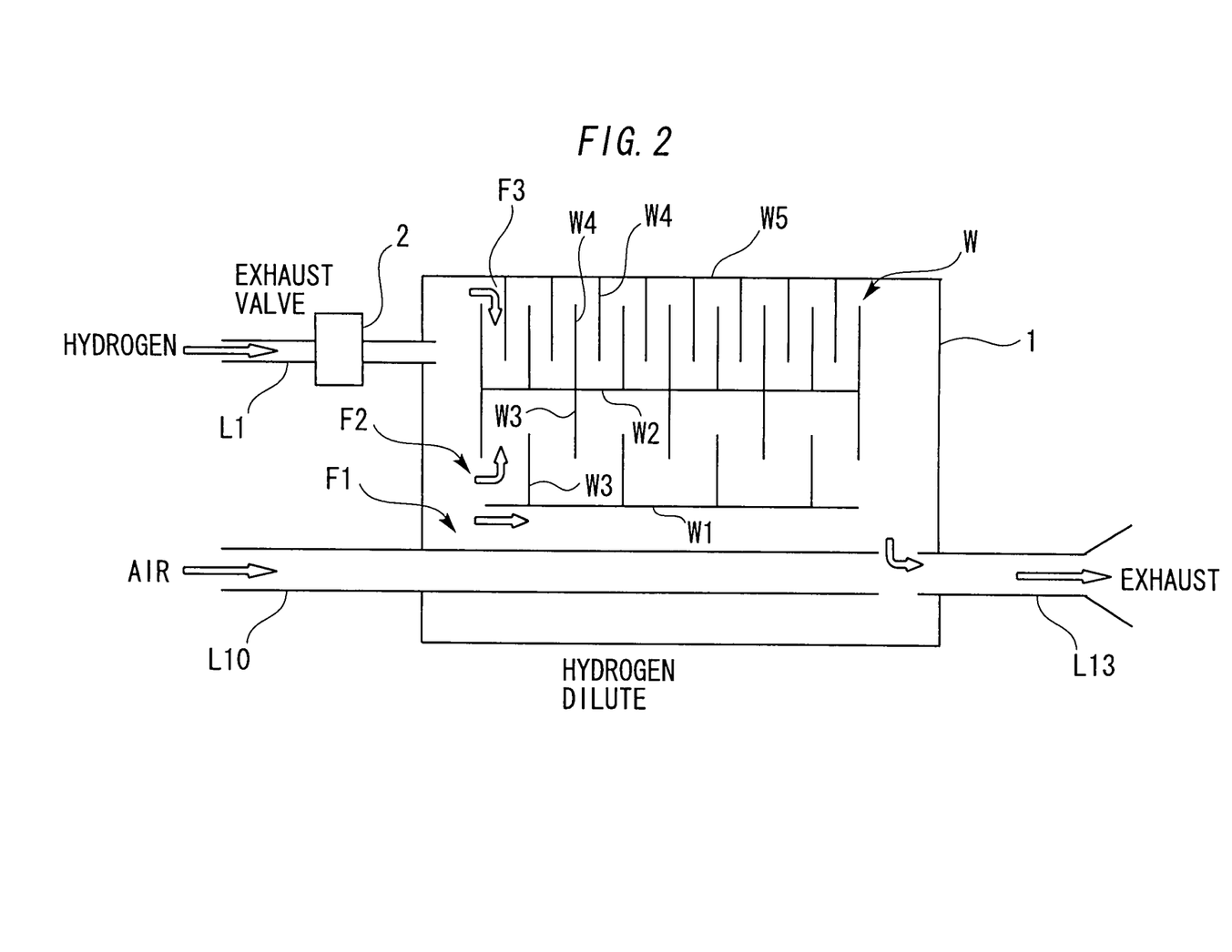
FIG. 2 is a view of a construction of the diluter according to a second embodiment of the present invention.

FIG. 2 illustrates a conceptual view of the diluter in the second embodiment. As in FIG. 2, the diluter has the single dilution chamber 1. Within the dilution chamber 1, the passage branches off into a plurality of passages F1, F2, F3 through wall members W (W is a generic symbol of W1-W4).

FIG. 2 shows a sectional view of the dilution chamber 1, in which the wall members W are erected in a vertical direction as viewed on the sheet surface of the drawing to be stuck to internal surfaces (upper and lower sides as viewed on the sheet surface) of the side walls, disposed in parallel, of the dilution chamber 1. Accordingly, the wall members W partition the dilution chamber 1 into spaces of the passages F1, F2, F3.

As in FIG. 2, the passage F1 (corresponding to a first passage according to the present invention) is formed along the flat wall member W1 substantially in parallel with the passage L10. Further, the passage F2 (corresponding to a second passage according to the present invention), which is interposed between the two parallel wall members W1 and W2, is formed zigzag along protruded walls W3 protruding in a comb-like shape alternately from the wall members W1, W2. The passages F1, F2 correspond to a plurality of passages according to the present invention. Therefore, the passage F2 is longer in its path length than the passage F1. Moreover, the passage F3 (corresponding a plurality of second passages according to the present invention), which is interposed between the internal surface of a side wall W5 of the dilution chamber and the wall member W2 that is substantially parallel with the passage L10, is formed zigzag along protruded walls W4 protruding in the comb-like shape alternately from the internal surface of the side wall W5 and from the wall member W2. Then, an interval between the protruded walls W4 is shorter than an interval between the protruded walls W3. Hence, the passage F3 is much longer in its path length than the passage F2.

The air flows within the passage L10. An end portion of the passage L10 faces an end portion of the passage L13 on the exhaust side, with a predetermined spaced area being interposed therebetween within the dilution chamber 1.

In this configuration, the off-gas discharged from the exhaust valve 2 diverges respectively into the passages F1, F2, F3 and gets diffused within the dilution chamber 1. Then, the passages F1, F2, F3 converge, via the path lengths different from each other, at a portion in the vicinity of the spaced area between the passages L10 and L13 (which corresponds to a converging portion according to the present invention). Further, the portion vicinal to the spaced area and the passages L1, L13 correspond to mixing portion according to the present invention. Therefore, the off-gas discharged from the exhaust valve 2 reaches the spaced area between the passages L10 and L13 at different timings through the passages F1, F2, F3. Consequently, in the diluter according to the second embodiment, the off-gas containing the high-concentration hydrogen flowing from the opened exhaust valve 2 diverges at the passages F1, F2, F3, then reaches at the different timings the spaced area between the passages L10 and L13 in which the air flows, and thus gets mixed with the flow of the air.

Namely, the diluter includes the plurality of passages different from each other in terms of the gas passing time in the path extending from the gas inlet (e.g., the position of the exhaust valve 2) to the position, where the hydrogen is mixed with the air, of the dilution chamber (which is, e.g., in the case of FIG. 2, the portion vicinal to the spaced area between the passages L10 and L13). These passages can be also said to be the plurality of passages different from each other in terms of their timings at which the gas flows from the gas inlet through the respective passages to the mixing chamber.

With this configuration, the diluter according to the second embodiment, in the same way as by the diluter in the first embodiment, disperses the occurrence of the peak of the concentration of the hydrogen at the different timings, thereby enabling the peak concentration to be reduced.

Note that the second embodiment has exemplified the dilution chamber having the passages F1, F2, F3. The implementation of the present invention is not, however, restricted to the number of these passages. For example, the dilution chamber may be configured to allow the off-gas to flow through two branch passages and may also be configured to include four or more branch passages.

Moreover, another available scheme is that the diluter is constructed, as in the case of the diluter according to the first embodiment, by connecting in series a plurality of dilution chambers 1 including the branch passages illustrated in the second embodiment. Namely, the dilution chambers 1 described in the second embodiment may also be employed respectively as the dilution chambers 1A, 1B and 1C provided in the diluter according to the first embodiment.

Third Embodiment

The diluter according to a third embodiment of the present invention will be described with reference to FIG. 3. The first embodiment has exemplified the diluter, in which the peak of the concentration of the hydrogen of the gas discharged is dispersed by connecting in series the plurality of dilution chambers 1A through the passages L11 etc. Further, the second embodiment has exemplified the diluter, in which the plurality of passages different in terms of their path lengths is provided within the single dilution chamber, and the occurrence timing of the peak of the concentration of the hydrogen is dispersed. In the embodiment, a single passage is provided within one dilution chamber, and the gas inlets are provided in different positions on this passage. Then, the off-gas discharged from the side of the fuel electrode is diverged and thus introduced into the respective gas inlets. There are different path lengths extending from the respective gas inlets to the terminal of the passage, and hence it follows that the timings at which to reach the terminal of the passage are different for every gas introduced into each of the gas inlets. With this configuration, it follows that the peak of the concentration of the hydrogen is dispersed. Other configurations and operations are the same as those in the first and second embodiments. Such being the case, the same components as those in the first and second embodiments are marked with the same symbols and numerals, and their explanations are omitted.

Figure 3:
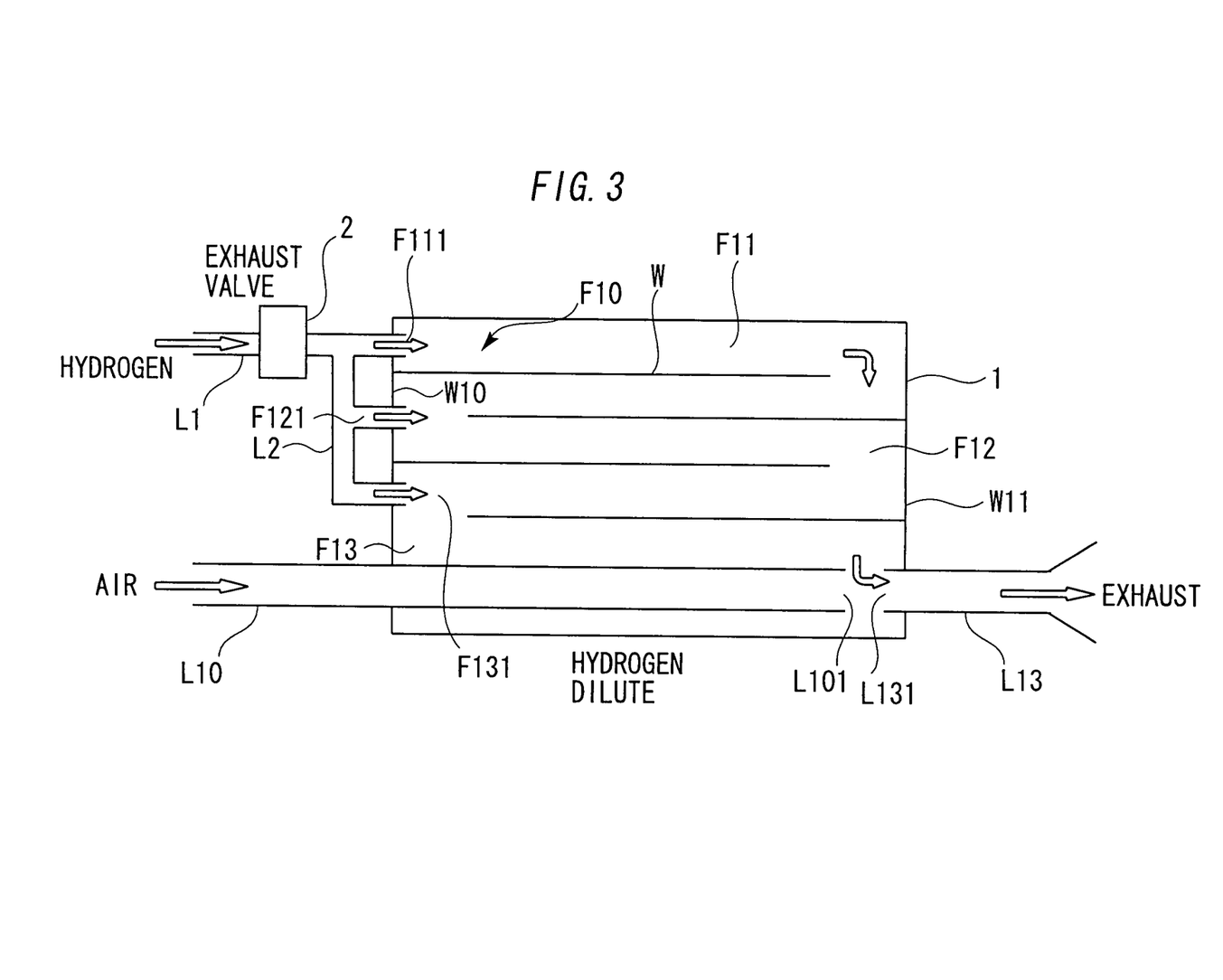
FIG. 3 is a view of a construction of the diluter according to a third embodiment of the present invention.

FIG. 3 shows a conceptual view of the diluter according to the third embodiment. As in FIG. 3, the diluter has the dilution chamber 1. In the dilution chamber 1, a passage F10 is formed along the wall members W. As in FIG. 3, the wall members W project alternately from the internal surfaces of the right-and-left side walls W10, W11 of the dilution chamber, and extend to positions close to the internal surfaces opposite side walls facing each other. Thus, the wall members W form the passage F10 (corresponding to a first passage according to the present invention) extending zigzag within the dilution chamber 1.

The left side wall W10 of the dilution chamber 1 is formed with apertures F111, F121, F131. Now, a passage, which extends forward along the wall member W from the vicinity of the aperture F111, close to the exhaust valve 2, of the side wall W10, turns its direction in the vicinity of the internal surface of the opposite wall W11 in a face-to-face relationship and returns to a position vicinal to the internal surface of the side wall W10, is called a passage F11. Further, a passage, which extends forward along the wall member W from the vicinity of the aperture F121 of the side wall W10, turns its direction in the vicinity of the internal surface of the opposite wall W11 in the face-to-face relationship and returns to the position vicinal to the internal surface of the side wall W10, is called a passage F12. Still further, a passage, which extends forward along the passage L10 from the vicinity of the aperture F131, disposed farthest from the exhaust valve 2, of the side wall W10, is called a passage F13. The passage F10 takes such a configuration that the partial passages F11, F12, F13 are connected in series.

The apertures F111, F121, F131 are provided at midpoints of the passage F10 and respectively connected to the exhaust valve 2 via the branch passage L2 (corresponding to a branch passage according to the present invention).

In the same way as in the second embodiment, the air flows through the passage L10. The aperture L101 of the passage L10 faces, in the vicinity of the terminal of the passage F10 within the dilution chamber 1, the aperture L131 of the end portion of the passage L13 for exhausting via the predetermined spaced area.

A path length extending from the aperture F111 to the terminal of the passage F10 is a length of the respective connections between the partial passages F11, F12 and F13. Further, a path length extending from the aperture F121 to the terminal of the passage F10 is a length of the connection between the partial passages F12 and F13. Still further, a path length extending from the aperture F131 to the terminal of the passage F10 is a length of the partial passage F13.

Therefore, when the off-gas discharged from the exhaust valve 2 gets diverged and introduced into the apertures F111, F121, F131 via the branch passage L2, it follows that the timings at which the off-gas reaches the terminal of the passage F10 from the respective apertures are differentiated. Namely, the off-gas introduced into the aperture F131 reaches first the terminal of the passage F10 and mixes with the flow of the air from the spaced area between the passages F10 and L13.

Thereafter, with a delay of the time when the off-gas spreads in the passage F12, the off-gas introduced into the aperture F121 mixes with the flow of the air from the spaced area between the passages F10 and L13.

Then finally, with a delay of the time when the off-gas spreads in the passages F11, F12, the off-gas introduced into the aperture F111 mixes with the flow of the air from the spaced area between the passages F10 and L13.

Namely, the diluter is provided with the plurality of passages different from each other in terms of the gas passing time in the path extending from the gas inlet (e.g., the position of the exhaust valve 2) to the position, where the hydrogen is mixed with the air, of the dilution chamber (which is, e.g., in the case of FIG. 3, the portion vicinal to the spaced area between the passages L10 and L13). These passages can be also said to be the plurality of passages different from each other in terms of their timings at which the gas flows from the gas inlet through the respective passages to the mixing chamber.

Thus, the diluter in the third embodiment, in the same way as in the second embodiment, enables the occurrence of the peak of the concentration of the hydrogen with the opening of the exhaust valve 2 to disperse at the different timings and enables the peak concentration to be reduced.

Note that the third embodiment has exemplified the dilution chamber having the partial passages F11, F12, F13 connected to the branch passage L12 diverging into the three passages and to the branch passage. The implementation of the present invention is not restricted to the number of these branches. For example, there may be taken a configuration of branching into two passages and may also be taken a configuration of branching into four or more passages.

Moreover, there may also be taken the configuration as in the case of the diluter according to the first embodiment by connecting the plurality of dilution chambers 1 including the passage branching off as exemplified in the third embodiment. Namely, there may be used the dilution chambers 1 described in the third embodiment as the dilution chambers 1A, 1B, 1C provided in the diluter according to the first embodiment.

Other Modified Examples

In the first through third embodiments, for example, as illustrated in FIG. 1 (which is the same with FIGS. 2 and 3), the dilution chamber is constructed so that the right end portion of the passage L10 is inserted deep into the dilution chamber 1A, and the aperture L101 is spaced at a predetermined distance from the aperture L111 at the left end portion of the passage L11. This is the same with the dilution chambers 1B, 1C in FIG. 1. The implementation of the present invention is not limited the configuration of these dilution chambers. For example, an available configuration is that the passage L10 etc is opened directly into the dilution chamber 1 in the vicinity of the left side wall of the dilution chamber 1A etc. Namely, the implementation of the present invention has the characteristic of dividing the discharge of the hydrogen in terms of the time by, as illustrated in the first through fourth embodiments, providing the plurality of dilution chambers (the first embodiment) or by branching the (main) passage into the plurality of passages (the second and third embodiments), and is not limited to the configuration of providing the passage L10 etc where the air flows, e.g., a degree of how much the passage L10 is inserted deep into the dilution chamber 1A etc.

Other Modes

Further, the embodiments include the following modes.
(Mode 1)
A diluter is constructed such that a first gas is introduced from the gas inlet via the gas passage, and a concentration of the first gas is reduced by mixing the first gas with a second gas in a dilution space, wherein the gas passage has a plurality of passages different from each other in terms of timings at which the first gas reaches a dilution chamber from the gas inlet.
(Mode 2)
The diluter further has a plurality of dilution chambers, each of the plurality of passages is connected to the dilution chamber, and the respective dilution chambers are connected via communication passages through which the second gas flows.

INDUSTRIAL APPLICABILITY

The present invention can be applied in general industrial fields where two or more types of gases are mixed. For example, the present invention can be applied to the industrial fields where the fuel gas such as the hydrogen gas is diluted by the air down to a flammability concentration or under.

What is claimed is:

1. A gas diluter, for mixing a first gas to be diluted with a second gas diluting the first gas, comprising:
    a plurality of passages receiving introduction of the first gas and different from each other in terms of passing time of the first gas after being introduced; and
    a mixing portion mixing the first gas passing through said plurality of passages with the second gas;
    wherein said plurality of passages includes:
        a plurality of dilution chambers decreasing a concentration of the first gas by mixing the first gas with the second gas;
        connection passages directly connecting said plurality of dilution chambers in series; and
        a branch passage introducing the first gas in distribution into said plurality of dilution chambers, and
    wherein said mixing portion includes:
        an introduction passage introducing the second gas into one dilution chamber positioned at one end portion of said plurality of dilution chambers connected in series; and
        a discharge port through which to discharge a mixture gas of the first gas and the second gas from other dilution chamber positioned at the other end portion of said plurality of dilution chambers connected in series,
    wherein an aperture of the introducing passage is spaced at a predetermined distance from an aperture of one of the connection passages in the dilution chamber positioned at the one end portion, and an aperture of a passage for exhaustion having the discharge port is spaced at a predetermined distance from an aperture of one of the connection passages in the dilution chamber positioned at the other end portion, and apertures of the connection passages are spaced at a predetermined distance from each other in the other dilution chambers.

2. The gas diluter according to claim 1, further comprising a control valve controlling an inflow of the first gas into said branch passage.

3. The gas diluter according to claim 1, wherein the first gas is a discharge gas discharged from a fuel cell and is applied to said fuel cell that is purged of hydrogen intermittently.

4. A gas diluter for mixing a first gas with a second gas, comprising:
    a plurality of passages receiving introduction of the first gas and different from each other in terms of passing time of the first gas after being introduced; and
    a mixing portion mixing the first gas passing through said plurality of passages with the second gas,
    wherein said plurality of passages includes:
        a first passage having a first path length and diffusing the first gas; and
        a plurality of second passages branching off from said first passage and having second path lengths different from each other, and
    wherein said mixing portion includes:
        an introduction passage introducing the second gas;
        a converging portion having convergence of the first gas passing through any one of said first passage and said plurality of second passages with the second gas introduced from said introduction passage; and
        a discharge port discharging a mixture gas of the first gas and the second gas from said converging portion,
    wherein the plurality of second passages is formed by a plurality of wall members, forming a first zigzag passage of the plurality of second passages in a zigzag shape and a second zigzag passage of the plurality of second passages in a zigzag shape, and
    wherein the first zigzag passage defines a gas path of a length different than a length of a gas path formed by the second zigzag passage, and
    wherein the converging portion is provided so that the first gas passing through the first passage and the first and second zigzag passages included in the plurality of second passages can reach a spaced area between an end portion of the introduction passage through which the second gas passes and an end of an exhaust passage having the discharge port within a dilution chamber.

5. The gas diluter according to claim 4, further comprising a control valve controlling an inflow of the first gas into said first passage.

6. The gas diluter according to claim 4, wherein the first gas is a discharge gas discharged from a fuel cell and is applied to said fuel cell that is purged of hydrogen intermittently.

* * * * *